United States Patent [19]
Greuter et al.

[11] 3,925,486
[45] Dec. 9, 1975

[54] POLYCYCLIC ALCOHOLS

[75] Inventors: Hans Greuter, Horgen; Georg Frater, Greifensee; Hans Schmid, Schwerzenbach, all of Switzerland

[73] Assignee: Hoffmann-La Roche Inc., Nutley, N.J.

[22] Filed: Nov. 7, 1972

[21] Appl. No.: 304,402

[30] Foreign Application Priority Data
Nov. 12, 1971 Switzerland............ 16518/71
Mar. 10, 1972 Switzerland............ 3563/72
July 26, 1972 Switzerland............ 11146/72

[52] U.S. Cl............ 260/617 F; 252/522; 260/345.2; 260/346.2; 260/488 B; 260/586 M; 260/586 R; 260/590; 260/611 F; 260/618 R; 260/631 R

[51] Int. Cl.²........................................ C07C 35/22
[58] Field of Search........................... 260/617 F

*Primary Examiner*—Donald G. Daus
*Assistant Examiner*—D. B. Springer
*Attorney, Agent, or Firm*—Samuel L. Welt; Jon S. Saxe; Richard A. Gaither

[57] ABSTRACT

Tricyclo[5,4,0,0$^{3,9}$]undec-2-ols, tricyclo[5,3,1,0$^{3,8}$]undec-2-ols, 2H-1-benzopyrans and benzofurans which are useful in the perfumery art and a process for their preparation from tricyclo[5,4,0,0$^{3,9}$]undec-2-ones and tricyclo[5,4,0,0$^{3,8}$]undec-2-ones.

11 Claims, No Drawings

POLYCYCLIC ALCOHOLS

SUMMARY OF THE INVENTION

This invention relates to polycyclic compounds of the formulae:

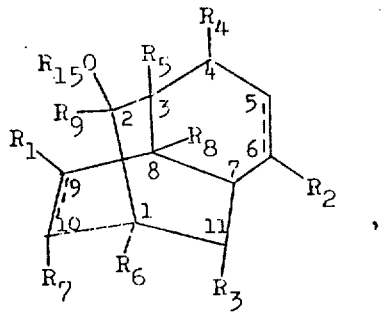

I-A

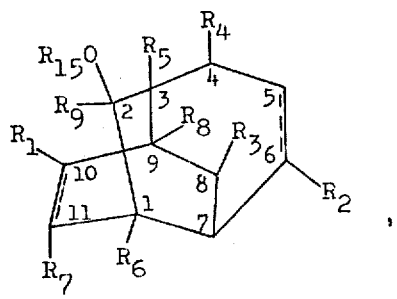

I-B

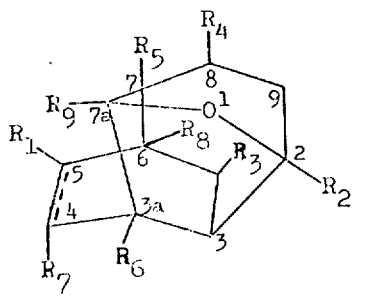

I-C

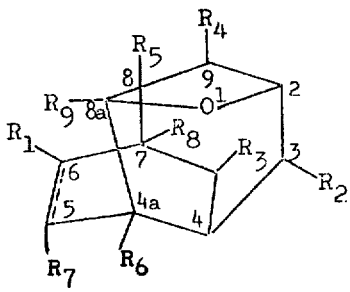

I-D wherein $R_1$, $R_7$ and $R_8$ are independently selected from the group consisting of hydrogen, lower alkyl or lower alkoxy; $R_2$ is hydrogen, lower alkyl, or lower alkenyl; $R_3$ and $R_4$ are independently selected from the group consisting of hydrogen or lower alkyl; $R_5$ and $R_6$ are independently lower alkyl; $R_9$ is hydrogen, lower alkyl, lower alkenyl or phenyl; $R_{15}$ is hydrogen, lower alkyl or lower alkanoyl and wherein the dotted bond can be optionally hydrogenated.

The compounds of formulae I-A, I-B, I-C and I-D above have a coumarin or hay-like odor and they show, in particular, lovage-like notes reminiscent of fig tree foilage and light tobacco. The compounds of formulae I-A, I-B, I-C and I-D above because of their fragrance are useful in the preparation of perfumes, colognes and other scented compositions.

DETAILED DESCRIPTION OF THE INVENTION

As used in this application, the expression "lower alkyl" includes both straight-chain and branched-chain hydrocarbon groups containing 1–6 carbon atoms such as methyl, ethyl, propyl, isopropyl, pentyl, 3-pentyl and the like. The alkyl moieties in the "lower alkoxy" groups are of the same kind. The expression "lower alkenyl" includes both straight-chain and branched-chain hydrocarbon groups containing 2–6 carbon atoms such as vinyl, allyl, butenyl, pentenyl and the like. The expression "halogen" includes fluorine, chlorine, bromine and iodine. The term "lower alkanoyl" includes lower alkanoyl groups containing from 2–6 carbon atoms such as acetyl, propionyl, etc.

Preferred compounds of formulae I-A and I-B above are those in which $R_2$, $R_5$ and $R_6$ each represent a lower alkyl group, preferably a methyl group. Also preferred are those compounds wherein $R_2$, $R_5$ and $R_6$ are lower alkyl, particularly methyl, and $R_9$ is hydrogen, vinyl or methyl. Another preferred embodiment of this invention are those compounds of formulae I-A or I-B where $R_1$, $R_2$, $R_5$ and $R_6$ are lower alkyl, preferably methyl; those compounds where $R_1$, $R_5$, $R_6$ and $R_9$ are lower alkyl, preferably methyl, and those compounds where $R_1$, $R_2$, Rhd 5, $R_6$ and $R_9$ are lower alkyl, preferably methyl. Especially preferred tricyclic ketones are:

1,3,6-trimethyl-tricyclo[5,4,0,0$^{3,9}$]undeca-5,10-dien-2-ol;
1,3,6-trimethyl-tricyclo[5,3,1,0$^{3,8}$]undeca-5,9-dien-2-ol;
1,3,10-trimethyl-tricyclo[5,4,0,0$^{3,9}$]undeca-5,10-dien-2-ol;
1,3,9-trimethyl-tricyclo[5,3,1,0$^{3,8}$]undeca-5,9-dien-2-ol;
1,3,6,10-tetramethyl-tricyclo[5,4,0,0$^{3,9}$]undeca-5,10-dien-2-ol;
1,3,6-trimethyl-tricyclo[5,4,0,0$^{3,9}$]undecan-2-ol;
1,3,6-trimethyl-tricyclo[5,3,1,0$^{3,8}$]undecan-2-ol;
1,3,10-trimethyl-tricyclo[5,4,0,0$^{3,9}$]undecan-2-ol;
1,3,9-trimethyl-tricyclo[5,3,1,0$^{3,8}$]undecan-2-ol;
1,3,6,10-tetramethyl-tricyclo[5,4,0,0$^{3,9}$]undecan-2-ol;
1,2,3,6-tetramethyl-tricyclo[5,4,0,0$^{3,9}$]undeca-5,10-dien-2-ol;

1,2,3,6-tetramethyl-tricyclo[5,3,1,0³,⁸]undeca-5,9-dien-2-ol;

1,2,3,10-tetramethyl-tricyclo[5,4,0,0³,⁹]undeca-5,10-dien-2-ol;

1,2,3,9-tetramethyl-tricyclo[5,3,1,0³,⁸]undeca-5,9-dien-2-ol;

1,2,3,6,10-pentamethyl-tricyclo[5,4,0,0³,⁹]undeca-5,10-dien-2-ol;

1,3,6-trimethyl-2-vinyl-tricyclo[5,4,0,0³,⁹]undeca-5,10-dien-2-ol;

1,3,6-trimethyl-2-vinyl-tricyclo[5,3,1,0³,⁸]undeca-5,9-dien-2-ol;

1,2,3,6-tetramethyl-tricyclo[5,4,0,0³,⁹]undecan-2-ol;

1,2,3,6-tetramethyl-tricyclo[5,3,1,0³,⁸]undecan-2-ol;

1,2,3,10-tetramethyl-tricyclo[5,4,0,0³,⁹]undecan-2-ol;

1,2,3,9-tetramethyl-tricyclo[5,3,1,0³,⁸]undecan-2-ol; and 1,3,6-trimethyl-2-vinyl-tricyclo[5,4,0,0³,⁹]undecan-2-ol According to the process provided by the present invention, the polycyclic compounds of formulae I-A, I-B, I-C and I-D above are produced by a. reducing a ketone of the formulae:

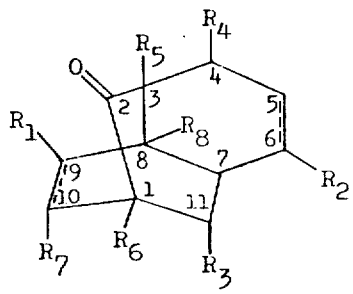 or 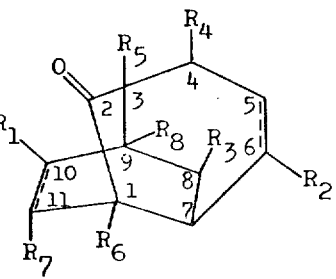

II-A                II-B wherein $R_1$, $R_2$, $R_3$, $R_4$, $R_5$, $R_6$, $R_7$ and $R_8$ are as above; and the dotted bond can be optionally hydrogenated;

with a complex metal hydride or b. reacting a ketone of formula II-A or formula II-B with a compound of the formula Me—$R_{11}$   III wherein $R_{11}$ is lower alkyl, lower alkenyl or phenyl; and Me is lithium, sodium or MgX; and X is chlorine, bromine or iodine;

or c. hydrogenating a polycyclic compound of formulae I-A, I-B, I-C or I-D which contains at least one olefinic double-bond in the presence of a noble metal catalyst, or d. lower alkylating or lower alkanoylating the hydroxyl group in a polycyclic compound of formulae I-A or I-B in which $R_{15}$ represents a hydrogen atom, or e. treating a polycyclic compound of formula I-B in which $R_{15}$ represents a hydrogen atom in which a 5,6-double bond is present with mercury-(II) acetate in tetrahydrofuran to produce a compound of the formulae I-C and I-D.

For the manufacture of polycyclic compounds of formulae I-A and I-B in accordance with embodiment (a) of the present process, the carbonyl group in ketone of formulae II-A or II-B is reduced with a complex metal hydride. As the complex metal hydride there can be used, for example, an alkali metal borohydride such as sodium borohydride or lithium borohydride, an alkaline earth metal borohydride such as calcium borohydride, an alkali metal aluminum hydride such as lithium aluminum hydride or diisobutyl aluminum hydride, preferably bis-(methoxy-ethylene-oxy)-sodium-aluminum hydride. For the reduction with a complex metal hydride, a ketone starting material of formulae II-A or II-B is dissolved in an inert solvent such as, for example, tetrahydrofuran, dioxan, diethyl ether, hexane, toluene or xylene. When bis-(methoxy-ethyleneoxy)-sodium-aluminum hydride is used as the complex metal hydride the ketone starting material is dissolved in benzene. Advantageously, the reduction agent is dissolved in the same solvent in which the ketone starting material has been dissolved and added to the solution of said ketone. Preferably, the complex metal hydride is employed in a molar excess. The temperature at which the reduction is carried out can vary in wide ranges. Depending on the ketone starting material and complex metal hydride, the reduction is carried out at a temperature between −70°C. and +80°C. In general, a temperature between 20°C. and 80°C. is preferred.

The reaction of a ketone of formulae II-A or II-B with a compound of formula III in accordance with embodiment (b) of the present process is carried out in an inert solvent under conditions which are conventional for carrying out Grignard reactions. Preferred solvents are diethyl ether, tetrahydrofuran and toluene. A preferred temperature range for this reaction lies between 20°C. and 120° C. Conveniently, moisture is excluded and the reaction is carried out in the atmosphere of a protecting gas, preferably nitrogen.

In accordance with embodiment (c) of the present process, a polycyclic compound of formulae I-A, I-B, I-C or I-D which contains at least one olefinic double-bond is hydrogenated in the presence of a noble metal catalyst. For this purpose, such a compound of formulae I-A, I-B, I-C or I-D is dissolved in an inert solvent and the mixture treated with a noble metal catalyst such as, for example, platinum oxide, mixtures of platinum oxide and platinum black, rhodium (on carbon or aluminum oxide) and especially palladium (on carbon). The hydrogen is introduced in the conventional manner and the hydrogenation terminated after the uptake of 1 or 2 moles of hydrogen. If the hydrogenation of a polycyclic compound of formula I-B which contains two olefinic double-bonds is interrupted after the uptake of 1 mole of hydrogen, then only the double-bond in the 10,11-position will have been completely saturated.

The etherification and the esterification of the hydroxyl group in a polycyclic compound of formulae I-A and I-B in which $R_{15}$ is hydrogen in accordance with embodiment (d) of the present process is carried out according to conventional methods of etherification and esterification.

The compounds of formulae I-C and I-D above are produced by embodiment (e) from the compound of formula I-B where $R_{15}$ is hydrogen and a 5,6-double bond is present. The reaction of embodiment (e) is carried out by treating the compound of the formula I-B with mercury II acetate in tetrahydrofuran (see H. C. Brown et al., J. Am. Chem. Soc. Vol. 91 (1969) p. 5646).

In reaction of embodiment (e) the compounds of formulae I-C and I-D are produced as a mixture. This mixture can be separated into the compounds of formulae I-C and I-D by conventional methods such as chromatography.

The compounds of formulae II-A and II-B can be prepared from compounds of the formulae:

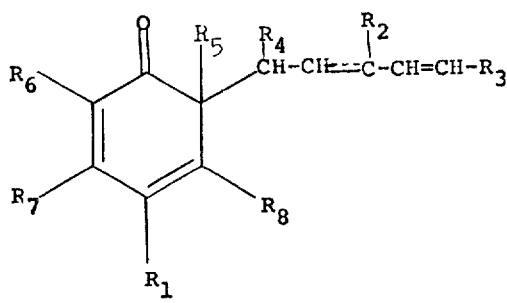

wherein $R_1$, $R_2$, $R_3$, $R_4$, $R_5$, $R_6$, $R_7$ and $R_8$ are as above; and the dotted bond can be optionally hydrogenated.

The compounds of formulae IV above, can be cyclized to form a mixture of compounds of the formula II-A and formula II-B above by heating the compound of the formula IV above. Generally, heating is carried out at a temperature of from 40° to 200° centigrade. In carrying out this reaction, temperatures of from 60° centigrade to 100° centigrade are preferred. However, the preferred temperature utilized in this cyclization will depend upon the particular starting material of formulae IV above which is utilized. Therefore, the preferred reaction temperature depends upon the nature of the substituents $R_1$, $R_2$, $R_3$, $R_4$, $R_5$, $R_6$, $R_7$ and $R_8$ in the compounds of the formula IV above and the particular solvent. For instance, when $R_2$ in the starting material of formula IV is methyl, better yields can be obtained in a shorter time than with the corresponding compound of formula IV where $R_2$ is hydrogen. The same is true for the reaction temperature. Thus, for best results in terms of yields, a decrease of the reaction time can be dispensed with in favor of a reduction of the reaction temperature. Also increasing the pressure will decrease the reaction time necessary to obtain optimum yields of the compounds of the formulae II-A and II-B.

While reaction temperatures of 40° centigrade to about 200° centigrade are generally utilized, the reaction can also take place at temperatures below 40° centigrade. However, at temperatures below 40° centigrade, the rate of the reaction is slow requiring long reaction times. Thus, the utilization of temperatures below 40° centigrade makes the process not practical for large scale purposes.

The compounds of formulae II-A and II-B are formed from the compounds of the formulae IV by heating the compounds of the formula IV in an inert organic solvent. In carrying out this reaction, any conventional inert organic solvent can be utilized. Generally, it is preferred to utilize inert organic solvents boiling above 40° centigrade. Among the preferred inert organic solvents are hydrocarbons such as hexane, octane, decane, benzene, toluene, etc.; halogenated hydrocarbons such as chloroform, methylenechloride, carbontetrachloride and chlorobenzene; ethers such as dioxane, tetrahydrofuran and anisole; amines such as aniline, dimethylaniline, triethylamine, pyridine, and quinoline; amides such as dimethylformamide, tetramethylurea or hexamethylphosphoric acid triamide; nitriles such as benzonitrile, acetonitrile, etc.; esters such as ethylacetate, butylacetate, etc.; ketones such as acetone, diethylketone and cyclohexanone; or a similar inert organic solvent such as dimethylsulfoxide, tetrahydrothiophene dioxide. When a low-boiling solvent is used, heating is conveniently carried out in an autoclave or a bomb tube so that the temperature can be raised in order to avoid unnecessary long reacting times.

In carrying out this reaction, it is generally best to avoid temperatures above 200° centigrade. This is true since at high temperatures, decomposition of the starting material and/or the product can set in.

If desired, the process can be carried out in the presence of a Lewis acid. Any conventional Lewis acid can be utilized in carrying out the process. Examples of Lewis acids which can be used are the protons, aluminum chloride, zinc chloride, tin tetrachloride, antimony chloride, iron trichloride, boron trifluoride, boron trifluoride etherate, etc. It is frequently advantageous to use as the proton donator a phenol corresponding to the starting material of formulae IV.

By heating the compound of the formulae IV a mixture of the compound of the formulae II-A and II-B is formed. The separation of this mixture into the individual components can be carried out by conventional means such as chromatography. Any conventional method of chromatography can be utilized to carry out this separation. A preferred method is by chromatography on silica gel with hexane/ethyl acetate (8:2 parts by volume) being an especially elution agent. The mixture can also be separated by distillation. Any conventional method of distillation such as distillation in a high vacuum can be utilized. The tricyclic ketone of formula II-B can be obtained in pure form by crystallization from saturated hydrocarbons such as pentane or hexane. It is preferred to carry out the chromatography or distillation step after the major amount of the tricyclic ketone of formula II-B has been crystallized. By this procedure of crystallization, an enrichment of the tricyclic ketone of formula II-A in the mixture is accomplished prior to separation by chromatography or distillation.

Where the tricyclic ketone of formula II-A or formula II-B contains at least one double bond, this compound may, if desired, be hydrogenated in the presence of a noble metal catalyst. Any conventional noble metal hydrogenation catalyst can be utilized for this purpose. In carrying out this hydrogenation, the appropriate tricyclic ketone of formula II-A or formula II-B can be dissolved in an inert organic solvent, and the mixture treated with a noble metal catalyst. Any conventional inert organic solvent can be utilized for this purpose. Among the preferred noble metal hydrogenation catalysts are included platinum oxide, platinum black, mixtures of platinum oxide and platinum black, rhodium alone or on a support such as carbon or aluminum oxide. Especially preferred as a catalyst for use in this process is palladium, alone or on a support such as carbon. The hydrogen is introduced in the usual manner and the hydrogenation terminated after the uptake of one or two moles of hydrogen. If the hydrogenation of a tricyclic ketone of formula II-B is interrupted after the uptake of one mole of hydrogen, then only the double bond in the 10, 11-positions will have been saturated.

The compounds of formula IV are prepared by reacting the sodium salt of a phenol of the formula:

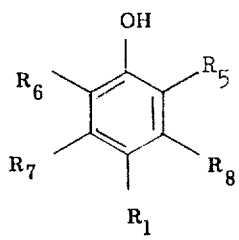

V wherein $R_1$, $R_5$, $R_6$, $R_7$ and $R_8$ are as above; with a compound of the formula:

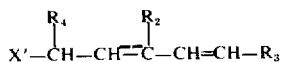

wherein $R_2$, $R_3$, and $R_4$ are as above; and $X'$ is chlorine, bromine, iodine or aryl sulfonyloxy or lower alkyl sulfonyloxy;

In carrying out this reaction, any conventional inert organic solvent can be used as the reaction medium. Among the preferred inert organic solvents is included aromatic hydrocarbons such as benzene, chlorobenzene and toluene.

According to a preferred embodiment of carrying out this reaction a phenol of formula V is dissolved, for example, in benzene and the solution treated with sodium hydride. After salt-formation has occurred, a compound of formula VI is introduced and the mixture is stirred for several hours at a temperature between 0° centigrade and 40° centigrade. Thereafter, the reaction mixture is poured on to water and shaken out with a strong base in order to remove the phenolic constituents. The organic phase is evaporated and the residue purified in the usual manner. As will be evident from the foregoing, the symbol $X'$ in formula VI stands for a leaving atom or group. Preferably, $X'$ stands for a bromine atom or a tosyloxy or mesyloxy group.

The tricyclic ketones of formulae I-A and I-B provided by the present invention possess particular odorant properties, their odor being coumarin or hay-like and, in particular, show lovage-like notes reminiscent of fig foilage and light tobacco.

The compounds of formulae I-A, I-B, I-C and I-D are utilized to impart fragrance to various materials such as cosmetics, perfume oils, soaps, lotions, detergents, etc. These compounds are incorporated into various materials in olfactory amounts to impart fragrance to the material. Also, these scented compositions can contain conventional perfume carriers and perfume diluents. Any conventional perfume carrier and perfume diluent can be utilized in preparing scented compositions in accordance with this invention.

The compounds of formulae I-A, I-B, I-C and I-D can be used in the manufacture of a wide variety of odorant compositions. They can be used, in particular, as components of perfume bases for modern lines (e.g., for bases of hay-, Tobacco-or honey-like character) as well as for fougere, chypre and lavender bases. Furthermore, the character of compositions having, for example, flower notes, especially hyacinth, gardenia, violet and lavender notes, can be altered or intensified with the aid of the present tricyclic ketones. These tricyclic ketones harmonize well in compositions with coumarins, ionones and rare wood essences such as vetiver oil, sandalwood oil or patchouli oil. The compounds of formulae I-A, I-B, I-C and I-D also possess fixative properties.

The amounts in which the compounds of formulae I-A, I-B, I-C and I-D can be used in odorant compositions vary within wide limits. In perfume bases they can be used, for example, in amounts of about 2–40 weight percent and in finished products such as perfumes, lotions, etc., they can be present in an amount of from about 1–5 percent. For the perfuming of technical products (e.g., solid and liquid detergents, synthetic washing agents, aerosols or cosmetic products of all kinds such as soaps), there can in general be used about 0.1–0.3 weight percent (in the case of washing agents) or about 0.8–2 percent (in the case of soaps) of such perfume bases.

Accordingly, it will be appreciated that the present invention also includes within its scope an odorant composition which contains as an essential odor-imparting ingredient or essential odor-imparting ingredients one or more of the polycyclic compounds of formulae I-A, I-B, I-C or I-D. Further, this invention also includes a method of imparting an odor to materials by applying thereto or incorporating therein an odor-imparting amount of one or more of the compounds of formulae I-A, I-B, I-C or I-D hereinbefore or an odorant composition as hereinbefore defined.

The following examples are illustrative but not limitative of the invention. All temperatures are in degrees centigrade.

EXAMPLE 1

0.1 mol of 1,3,6-trimethyl-tricyclo[5,4,0,0$^{3,9}$]undeca-5, 10-dien-2-one is dissolved in 40 ml of benzene and treated with 100 ml of a 60 percent by weight solution of bis-(methoxy-ethyleneoxy)-sodium aluminum hydride in benzene. The mixture is heated to reflux for 2 hours, the excess hydride decomposed with alcohol and the mixture thereafter poured into 1 liter of ice-water. The mixture obtained is extracted with n-hexane/diethyl ether (1:1 parts by volume), the organic phase washed neutral with water, dried and evaporated. The residue is distilled in a high vacuum (0.03 mmHg). There is obtained 1,3,6-trimethyl-tricyclo[5,4,0,0³,⁹]undeca-5,10-dien-2-ol of boiling point 68°–72°C/0.03 mmHg.

EXAMPLE 2

By the procedure of Example 1:

1,3,6-trimethyl-tricyclo[5,3,1,0³,⁸]undeca-5,9-dien-2-one is converted to 1,3,6-trimethyl-tricyclo[5,3,1,0³,⁸]undeca-5,9-dien-2-ol of boiling point 68°–72°C/0.03 mmHg;

1,3,10-trimethyl-tricyclo[5,4,0,0³,⁹]undeca-5,10-dien-2-one is converted to 1,3,10-trimethyl-tricyclo[5,4,0,0³,⁹]undeca-5,10dien-2-ol of boiling point 68°–72°C/0.03 mmHg;

1,3,9-trimethyl-tricyclo[5,3,1,0³,⁸]undeca-5,9-dien-2-one is converted to 1,3,9-trimethyl-tricyclo[5,3,1,0³,⁸]undeca-5,9-dien-2-ol of boiling point 68°–72°C/0.03 mmHg;

1,3,6,10-tetramethyl-tricyclo[5,4,0,0³,⁹]undeca-5,10-dien2-one is converted to 1,3,6,10-tetramethyl-tricyclo[5,4,0,0³,⁹]-undeca-5,10-dien-2-ol of boiling point 70°–75°C/0.03 mmHg;

1,3,6-trimethyl-tricyclo[5,4,0,0³,⁹]undecan-2-one is converted to 1,3,6-trimethyl-tricyclo[5,4,0,0³,⁹]undecan-2-ol of boiling point 82°–86°C/0.03 mmHg;

1,3,6-trimethyl-tricyclo[5,3,1,0³,⁸]undecan-2-one is converted to 1,3,6-trimethyl-tricyclo[5,3,1,0³,⁸]undecan-2-ol of boiling point 83°–87°C/0.03 mmHg;

1,3,10-trimethyl-tricyclo[5,4,0,0³,⁹]undecan-2-one is converted to 1,3,10-trimethyl-tricyclo[5,4,0,0³,⁹]undecan-2-ol of boiling point 88°–90°C/0.03 mmHg;

1,3,9-trimethyl-tricyclo[5,3,1,0³,⁸]undecan-2-one is converted to 1,3,9-trimethyl-tricyclo[5,3,1,0³,⁸]undecan-2-ol of boiling point 85°–89°C/0.03 mmHg;

1,3,6,10-tetramethyl-tricyclo[5,4,0,0³,⁹]undecan-2-one is converted to 1,3,6,10-tetramethyl-tricyclo[5,4,0,0³,⁹]undecan-2-ol of boiling point 90°–95°C/0.03 mmHg.

EXAMPLE 3

5 g. of 6-(3-methyl-penta-2,4-dienyl)-2,6-dimethyl-cyclohexa-2,4-dien-1-one are dissolved in 25 ml of benzene and treated with 5 g of 2,6-dimethylphenol. The mixture is heated at reflux for 6 hours. After cooling to room temperature, the mixture is shaken out portionwise with a solution of 35 g of potassium hydroxide, 25 ml of water and 100 ml of methanol. The organic phase is concentrated and the residue distilled at 70°–90°C/0.03 mmHg. The distillate contains 1,3,6-trimethyl-tricyclo[5,4,0,0³,⁹]undeca-5,10-dien-2-one and 1,3,6-trimethyl-tricyclo[5,3,1,0³,⁸]undeca-5,9-dien-2-one in the approximate proportion 3:1 parts by volume.

This 3:1 mixture is dissolved in equal parts by volume of hexane or pentane and cooled to −30°C. The first-named solid ketone separates out to a large extent with scratching. Concentration of the filtrate and repetition of this operation yields further crystals of this ketone. The composition of the mixture of the foregoing ketones thereby changes from 3:1 to approximately 1:3. The ultimate separation is carried out by chromatography on silica gel using hexane/ethyl acetate (8:2 parts by volume) as the elution agent. There are thus obtained 1,3,6-trimethyl-tricyclo[5,4,0,0³,⁹]undeca-5,10-dien2-one of melting point 54°–55°C and 1,3,6-trimethyl-tricyclo[5,3,1,0³,⁸]undeca-5,9-dien-2-one of boiling point 70°–75°C/0.03 mmHg.

EXAMPLE 4

By the procedure of Example 3:

6-(penta-2,4-dienyl)-2,4,6-trimethyl-cyclohexa-2,4-dien-1-one is converted to 1,3,10-trimethyl-tricyclo[5,4,0,0³,⁹]undeca-5,10-dien-2-one of melting point 49°–50°C and 1,3,9-trimethyl-tricyclo[5,3,1,0³,⁸]undeca-5,9-dien-2-one of boiling point 70°–75°C/0.03 mmHg (reaction time 48 hours); and 6-(3-methyl-penta-2,4-dienyl)-2,4,6-trimethyl-cyclohexa-2,4-dien-1-one is converted to 1,3,6,10-tetramethyl-tricyclo-[5,4,0,0³,⁹]undeca-5,10-dien-2-one of melting point 83°–86 C and 1,3,6,9-tetramethyl-tricyclo[5,3,1,0³,⁸]undeca-5-9-dien-2-one of boiling point 70°–75°C/0.03 mmHg (reaction time 12 hours).

EXAMPLE 5

A 1 molar solution of 2,6-dimethylphenol in benzene is treated with sodium hydride and, after termination of the hydrogen evolution, the mixture is treated with a 10 percent molar excess of 3-methyl-penta-2,4-dienyl 1-bromide. After stirring overnight at 0°–5°C, the mixture is taken up in ether and shaken out with water, 10 percent by weight aqueous potassium hydroxide solution and with water. The dried organic phase contains 6-(3-methylpenta-2,4-dienyl)-2,6-dimethyl-cyclohexa-2,4-dien-1-one which accrues in a 80–90 percent yield. The dienone can be stored in solution at −10°C, but it is unstable in concentrated form and at higher temperatures. [U.V. in n-hexane: maxima at 2,300A (ϵ= 22,000) and 3,050A (ϵ= 4,270)].

EXAMPLE 6

By the procedure in Example 5:

2,4,6-trimethyl-phenol and penta-2,4-dienyl-1-bromide is converted to 6-(penta-2,4-dienyl)-2,4,6-trimethyl-cyclohexa-2,4-dien-1-one; [U.V. in n-hexane: maxima at 2,250 A (ϵ= 26,200) and 3,130 A (ϵ= 4460)]; and 2,4,6-trimethylphenol and 3-methyl-penta-2,4-dienyl-1-bromide is converted to 6-(3-methyl-penta-2,4-dienyl)-2,4,6-trimethyl-cyclohexa-2,4-dien-1-one; [U.V. in n-hexane: maxima at 2,290 A (ϵ = 2,350) and 3,100 A (ϵ = 4,400)].

EXAMPLE 7

2.5 g of 1,3,6-trimethyl-tricyclo[5,4,0,0³,⁹]undeca-5,10-dien-2-one are dissolved in 10 ml of diethyl ether and treated with 10 ml of 5 percent by weight methyl lithium solution in diethyl ether. The mixture is heated to reflux for 5 hours, the excess methyl lithium decomposed with ethyl alcohol and the mixture thereafter poured into 100 ml of water. The organic phase is separated, washed neutral with water, dried and evaporated. The residue is distilled in a bulb tube at 0.04 mmHg. There is obtained 1,2,3,6-tetramethyl-tricyclo[5,4,0,0³,⁹]undeca-5,10-dien-2-ol of boiling point 90°–95°C/0.04 mmHg.

EXAMPLE 8

By the procedure of Example 7:

1,3,6-trimethyl-tricyclo[5,3,1,0$^{3,8}$]undeca-5,9-dien-2-one is converted to 1,2,3,6-tetramethyl-tricyclo[5,3,1,0$^{3,8}$]undeca-5,9-dien-2-ol of boiling point 90°–95°C/0.04 mmHg;

1,3,10-trimethyl-tricyclo[5,4,0,0$^{3,9}$]undeca-5,10-dien-2-one is converted to 1,2,3,10-tetramethyl-tricyclo[5,4,0,0$^{3,9}$]undeca-5,10-dien-2-ol of boiling point 90°–95°C/0.04 mmHg;

1,3,9-trimethyl-tricyclo[5,4,1,0$^{3,8}$]undeca-5,9-dien-2-one is converted to 1,2,3,9-tetramethyl-tricyclo[5,3,1,0$^{3,8}$]undeca-5-9-dien-2-ol of boiling point 90°–95°C/0.04 mmHg;

1,3,6,10-tetramethyl-tricyclo[5,4,0,0$^{3,9}$]undeca-5,10-dien-2-one is converted to 1,2,3,6,10-pentamethyl-tricyclo[5,4,0,0$^{3,9}$]-undeca-5,10-dien-2-ol;

1,3,6-trimethyl-tricyclo[5,4,0,0$^{3,9}$]undeca-5,10-dien-2-one with vinyl lithium (8.6 percent by weight solution of vinyl lithium in tetrahydrofuran) is converted to 1,3,6-trimethyl-2-vinyltricyclo[5,4,0,0$^{3,9}$]undeca-5,10-dien-2-ol of boiling point 116°–120°C/0.1 mmHg.

1,3,6-trimethyl-tricyclo[5,3,1,0$^{3,8}$]undeca-5,9-dien-2-one is converted to 1,3,6-trimethyl-2-vinyl-tricyclo[5,3,1,0$^{3,8}$]-undeca-5,9-dien-2-ol of boiling point 116°–120°C/0.1 mmHg;

1,3,6-trimethyl-tricyclo[5,4,0,0$^{3,9}$]undecan-2-one is converted to 1,2,3,6-tetramethyl-tricyclo[5,4,0,0$^{3,9}$]undecan-2-ol of boiling point 85°–88°C/0.03 mmHg;

1,3,6-trimethyl-tricyclo[5,3,1,0$^{3,8}$]undecan-2-one is converted to 1,2,3,6-tetramethyl-tricyclo[5,3,1,0$^{3,8}$]undecan-2-ol of boiling point 84°–86°C/0.03 mmHg;

1,3,10-trimethyl-tricyclo[5,4,0,0$^{3,9}$]undecan-2-one is converted to 1,2,3,10-tetramethyl-tricyclo[5,4,0,0$^{3,9}$]undecan-2-ol of boiling point 82°–85°C/0.03 mmHg;

1,3,9-trimethyl-tricyclo[5,3,1,0$^{3,8}$]undecan-2-one is converted to 1,2,3,9-tetramethyl-tricyclo[5,3,1,0$^{3,8}$]undecan-2-ol of boiling point 81°–85°C/0.03 mmHg; and 1,3,6-trimethyl-tricyclo[5,4,0,0$^{3,9}$]undecan-2-one with vinyl lithium is converted to 1,3,6-trimethyl-2-vinyl tricyclo-[5,4,0,0$^{3,9}$]undecan-2-ol of boiling point 110°–115°C/0.1 mmHg.

EXAMPLE 9

16 g of 1,3,6-trimethyl-tricyclo[5,3,1,0$^{3,8}$]undeca-5,9-dien-2-one are dissolved in 250 ml of methanol and hydrogenated in the presence of 1 g of Pd/C (5 percent). After uptake of 2 mols of hydrogen, the mixture is filtered off from the catalyst, evaporated and distilled. The distillate contains 1,3,6-trimethyl-tricyclo[5,3,1,0$^{3,8}$]undecan-2-one of boiling point 68°–70°C/0.05 mmHg. (A ca 4:1 parts by volume mixture of the isomers at carbon atom 6).

EXAMPLE 10

By the procedure of Example 9

1,3,10-trimethyl-tricyclo[5,4,0,0$^{3,9}$]undeca-5-10-dien-2-one is converted to 1,3,10-trimethyl-tricyclo[5,4,0,0$^{3,9}$]-undecan-2-one of boiling point 68°–70°C/0.05 mmHg;

1,3,6-trimethyl-tricyclo[5,4,0,0$^{3,9}$]undeca-5-10-dien is converted to 1,3,6-trimethyl-tricyclo[5,4,0,0$^{3,9}$]undecan-2-one of boiling point 72°–75°C/0.05 mmHg; and 1,3,9-trimethyl-tricyclo[5,3,1,0$^{3,8}$]undeca-5,9-dien-2-one is converted to 1,3,9-trimethyl-tricyclo[5,3,1,0$^{3,8}$]undecan-2-one of boiling point 68°–70°C/0.05 mmHg.

EXAMPLE 11

2 g of 1,3,6-trimethyl-tricyclo[5,4,0,0$^{3,9}$]undeca-5-10-dien-2-ol are dissolved in 30 ml of methanol and hydrogenated in the presence of 0.2 g of 5 percent by weight palladium on 95 percent by weight carbon. After the uptake of 2 mols of hydrogen, the mixture is filtered off from the catalyst, evaporated and distilled. The distillate contains 1,3,6-trimethyl-tricyclo[5,4,0,0$^{3,9}$]undecan-2-ol of boiling point 82°–86°C/0.03 mmHg.

EXAMPLE 12

By the procedure of Example 11

1,3,6-trimethyl-tricyclo[5,3,1,0$^{3,8}$]undeca-5,9-dien-2-ol is converted to 1,3,6-trimethyl-tricyclo[5,3,1,0$^{3,8}$]undecan-2-ol of boiling point 83°–87°C/0.03 mmHg;

1,3,10-trimethyl-tricyclo[5,4,0,0$^{3,9}$]undeca-5,10-dien-2-ol is converted to 1,3,10-trimethyl-tricyclo[5,4,0,0$^{3,9}$]-undecan-2-ol of boiling point 88°–90°C/0.03 mmHg;

1,3,9-trimethyl-tricyclo[5,3,1,0$^{3,8}$]undeca-5,9-dien-2-ol is converted to 1,3,9-trimethyl-tricyclo[5,3,1,0$^{3,8}$]undecan-2-ol of boiling point 85°–89°C/0.03 mmHg;

1,3,6,10-tetramethyl-tricyclo[5,4,0,0$^{3,9}$]undeca-5-10-dien-2-ol is converted to 1,3,6,10-tetramethyl-tricyclo[5,4,0,0$^{3,9}$]-undecan-2-ol of boiling point 90°–95°C/0.03 mmHg;

1,2,3,6-tetramethyl-tricyclo[5,4,0,0$^{3,9}$]undeca-5,10-dien-2-ol is converted to 1,2,3,6-tetramethyl-tricyclo[5,4,0,0$^{3,9}$]-undecan-2-ol of boiling point 85°–88°C/0.03 mmHg;

1,3,6-trimethyl-tricyclo[5,3,1,0$^{3,8}$]undeca-5,9-dien-2-ol is converted to 1,3,6-trimethyl-tricyclo[5,3,1,0$^{3,8}$]undecan-2-ol of boiling point 84°–86°C/0.03 mmHg;

1,3,10-trimethyl-tricyclo[5,4,0,0$^{3,9}$]undeca-5,10-dien-2-ol is converted to 1,3,10-trimethyl-tricyclo[5,4,0,0$^{3,9}$]undecan-2-ol of boiling point 82°–85°C/0.03 mmHg; and 1,3,9-trimethyl-tricyclo[5,3,1,0$^{3,8}$]undeca-5,9-dien-2-ol is converted to 1,3,9-trimethyl-tricyclo[5,3,1,0$^{3,8}$]undecan-2-ol of boiling point 81°–85°C/0.03 mmHg.

EXAMPLE 13

2.04 g of 1,3,6-trimethyl-tricyclo[5,4,0,0$^{3,9}$]undeca-5,10-dien-2-ol are dissolved in 20 ml of dimethoxyethane and treated with two equivalents of sodium hydride. The mixture is heated to reflux until hydrogen evolution is no longer to be observed and thereafter treated at room temperature with 2 ml of ethyl iodide. The mixture is heated under reflux for a further 14 hours and subsequently worked up as usual, i.e., poured into a water/ice mixture, extracted twice with hexane and the mixture, consisting of ca 80 percent by weight product and ca 20 percent by weight by-product, chromatographed on silica gel with hexane/ethyl acetate (7:3 parts by volume). There is obtained 2-methoxy-1,3,6-trimethyl-tricyclo[5,4,0,0$^{3,9}$]undeca-5,10-diene of boiling point 63°–66°C/0.04 mmHg.

EXAMPLE 14

2.04 g of 1,3,6-trimethyl-tricyclo[5,4,0,0$^{3,9}$]undeca-5,10-dien-2-ol are treated in 20 ml of dimethoxyethane with an equivalent amount of sodium hydride and heated (60°–70°C) until hydrogen evolution is no longer to be observed. After cooling to room temperature, 0.78 g of acetyl chloride dissolved in 2 ml of dimethoxyethane are added dropwise. A vigorous reaction thereby sets in. After 30 minutes, the mixture is poured into ice-water and shaken out twice with hexane. The dried and evaporated hexane phase is chromatographed on silicagel with hexane/ethyl acetate (7:3 parts by volume). There is obtained 2-acetoxy-1,3,6-trimethyl-tricyclo[5,4,0,0$^{3,9}$]undeca-5,10-diene of boiling point 90°–95°C/0.04 mmHg.

EXAMPLE 15

3 g of 1,3,6-trimethyl-tricyclo[5,4,0,0$^{3,9}$]undeca-5,10-dien-2-ol were dissolved in 150 ml of anhydrous tetrahydrofuran and treated with 4.7 g (1.47 · 10$^{-2}$ Mol) of mercury (II) acetate. The mixture was stirred for 24 hours at room temperature and thereafter treated with 50 ml of 1 N sodium hydroxide solution and 50 ml of a 2 percent by weight solution of sodium borohydride in ethyl alcohol whereby elemental mercury separated out. The mixture was filtered off from the mercury and extracted with hexane. The hexane phase was dried and evaporated and the residual colorless oil was distilled: boiling point 80°–85°C/0.03 mmHg. There was obtained a mixture of 3,4,4a,7,8,8a-hexahydro-3,4a,8-trimethyl-2,8:4, 7-dimethano-2H-1-benzopyran (2 C$_3$ epimers) and 2,3,3a,6,7,7a-hexahydro-2,3a7-trimethyl-2,7-ethano-3,6-methano-benzofuran. The separation of this mixture into the pyran and furan derivatives was carried out by preparative gas chromatography. The boiling point of each derivative was 80°–85°C/0.03 mmHg.

EXAMPLE 16

The following Example illustrates a typical odorant composition containing one of the polycyclic compounds provided by this invention:

Odorant composition containing 1,2,3,6-tetramethyl-tricyclo[5,3,1,0$^{3,8}$]undeca-5,9-dien-2-ol:

```
100  Amyris oil
300  Sandela Givaudan
 50  Resinoid Geranium
 50  Resinoid Elemi
 20  Patchouli oil
 20  Coumarin
 50  Geranium oil Bourbon
 70  Baccartol Givaudan
100  Para-tertiary-butyl cyclohexyl acetate
 20  Resinoid oak moss S
 50  Lilial Givaudan
 70  Bergamotte synthetic LG 61
 50  Lemongrass oil
 50  1,2,3,6-Tetramethyl-tricyclo[5,3,1,0³,⁸]-
     undeca-5,9-dien-2-ol
────
1000
```

The composition possesses a fresh-green fancy note with a woody foundation and can be used, for example, for the perfuming of men's soaps.

We claim:

1. A compound of the formula:

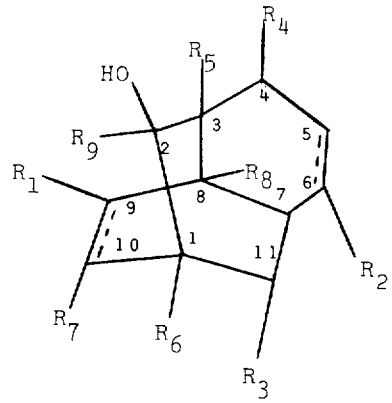

wherein $R_1$, $R_7$ and $R_8$ are independently selected from the group consisting of hydrogen, or lower alkyl; $R_2$ is hydrogen, or lower alkyl; $R_3$ and $R_4$ are independently selected from the group consisting of hydrogen or lower alkyl; $R_5$ and $R_6$ are independently lower alkyl; $R_9$ is hydrogen, or lower alkyl; and wherein the dotted bonds can be optionally hydrogenated and wherein lower alkyl has 1–6 carbon atoms.

2. The compound of claim 1 wherein $R_2$, $R_5$ and $R_6$ are lower alkyl and $R_9$ is hydrogen, or methyl.

3. The compound of claim 2 wherein said compound is 1,3,6-trimethyl-tricyclo[5,3,1,0$^{3,8}$]undeca-5,9-dien-2-ol.

4. The compound of claim 2 wherein said compound is 1,3,6-trimethyl-tricyclo[5,3,1,0$^{3,8}$]undecan-2-ol.

5. The compound of claim 2 wherein said compound is 1,2,3,6-tetramethyl-tricyclo[5,3,1,0$^{3,8}$]undeca-5,9-dien-2-ol.

6. The compound of claim 2 wherein said compound is 1,2,3,6-tetramethyl-tricyclo[5,3,1,0$^{3,8}$]undecan-2-ol.

7. The compound of claim 2 wherein $R_1$, $R_5$ and $R_6$ are lower alkyl.

8. The compound of claim 7 wherein said compound is 1,3,9-trimethyl-tricyclo[5,3,1,0$^{3,8}$]undeca-5,9-dien-2-ol.

9. The compound of claim 7 wherein said compound is 1,3,9-trimethyl-tricyclo[5,3,1,0$^{3,8}$]undecan-2-ol.

10. The compound of claim 7 wherein said compound is 1,2,3,9-tetramethyl-tricyclo[5,3,1,0$^{3,8}$]undeca-5,9-dien-2-ol.

11. The compound of claim 7 wherein said compound is 1,2,3,9-tetramethyl-tricyclo[5,3,1,0$^{3,8}$]undecan-2-ol.

* * * * *